US 6,600,602 B2

(12) United States Patent
Kleemann et al.

(10) Patent No.: US 6,600,602 B2
(45) Date of Patent: Jul. 29, 2003

(54) DIFFRACTION GRATING AND USES OF A DIFFRACTION GRATING (75) Inventors: Bernd Kleemann, Aalen (DE); Klaus Heidemann, Oberkochen (DE)

(73) Assignee: Carl-Zeiss Stiftung (DE)

( * ) Notice: Subject to any disclaimer, the term of this patent is extended or adjusted under 35 U.S.C. 154(b) by 0 days.

(21) Appl. No.: 09/863,745

(22) Filed: May 23, 2001

(65) Prior Publication Data

US 2002/0024735 A1 Feb. 28, 2002

(30) Foreign Application Priority Data

May 24, 2000 (DE) .......................................... 100 25 694

(51) Int. Cl.[7] .............................................. G02B 27/44
(52) U.S. Cl. ........................ 359/566; 359/580; 359/350; 359/572
(58) Field of Search ................................ 359/360, 350, 359/568, 569, 572, 576, 580

(56) References Cited

U.S. PATENT DOCUMENTS

| | | |
|---|---|---|
| 4,506,949 A | 3/1985 | Knop |
| 4,682,893 A | 7/1987 | Armandillo et al. |
| 4,714,308 A | 12/1987 | Sawamura et al. |
| 4,830,463 A | 5/1989 | Lemaire et al. |
| 4,915,463 A | 4/1990 | Barbee, Jr. |
| 5,116,461 A | 5/1992 | Lebby et al. |
| 5,629,804 A | 5/1997 | Tomono |

FOREIGN PATENT DOCUMENTS

| | | |
|---|---|---|
| DE | 25 22 547 | 12/1975 |
| DE | 263 362 | 12/1988 |
| DE | 4 303 162 | 8/1994 |
| DE | 4 421 407 | 6/1995 |
| EP | 0 020 132 | 12/1980 |
| EP | 0 742 455 | 4/1995 |
| EP | 1 003 078 | 5/2000 |
| JP | 6 201 909 | 7/1994 |

OTHER PUBLICATIONS

Fisun, Anatoly I., "Monofrequency Excitation of Open Resonator with Inclined Comb Grating," *International Journal of Infrared and Millimeter Waves*, vol. 18, No. 7, 1997, pp. 1431–1443.
Heidemann, Klaus F., and Zeiss, Carl, "Begungsgitter fur XUV–und VUV–Synchrotronstrahlung," *Zl mit, JR. 1*, Nr. 1, 1992, pp. 18–19. * See Attached Statement for Relevance.
Burndrett, David L., Gaylord, Thomas K., and Glytsis, Elias N., "Polarizing Mirror/Absorber for Visible Wavelengths Based on a Silicon Subwavelength Grating: Design and Fabrication," *Applied Optics*, vol. 37, No. 13, May 1, 1998, pp. 2534–2541.
Deng, Wenyong, and Chou, Stephen Y., "Fabrication and Properties of Visible–light Subwavelength Amorphous Silicon Transmission Gratings," 8527b *Journal of Vacuum Science and TechnologyB*, 13 (1995), Nov./Dec., No. 6, pp. 2879–2882.

*Primary Examiner*—Mark A. Robinson
*Assistant Examiner*—Fayez Assaf
(74) *Attorney, Agent, or Firm*—Factor & Partners (57) ABSTRACT

A diffraction grating (1) has a multiplicity of parallel diffraction structures succeeding one another periodically. The latter are arranged on a support (2) and each incorporate a slat (3) extending from a base area (4) of the support (2). Said slat has a substantially rectangular cross-section. The width w of the slat (3) comes to less than 100 nm, preferably between 20 nm and 60 nm, more preferably in the area of 50 nm. Advantageous uses of the diffraction grating (1) are obtained e.g. in a Littrow configuration, preferably in third order of the incident light beams (8), in particular at a light wavelength that is less than 250 nm.

18 Claims, 6 Drawing Sheets

DIFFRACTION GRATING AND USES OF A DIFFRACTION GRATING

The invention relates to a diffraction grating with a multiplicity of parallel diffraction structures succeeding one another periodically, which are arranged on a support and each incorporate a slat extending from a base area of the support. The invention also relates to uses for such a diffraction grating.

Known diffraction gratings of this kind exhibit in particular in the polarisation direction, which lies normal to the longitudinal extension direction of the slats (TM polarisation), a relatively poor reflection efficiency, i.e. a relatively poor diffraction efficiency in the order of diffraction employed. The latter furthermore fluctuates greatly with the angle of incidence or the light wavelength. The breadth of variation of the reflection efficiency in a relatively narrow range around the angle of incidence or the light wavelength, i.e. the distance between a minimum and a maximum value within said range, lies in the range of multiples of ten per cent.

If fixed light wavelength and angle of incidence values are set in advance, by virtue of the optical arrangement in which the known diffraction grating is used, the reflection efficiency obtained to date has been left to chance: e.g. there may be present in the TM polarisation direction for said parameters a bare minimum of the reflection efficiency. This cannot be tolerated in applications in which a high reflection efficiency of the diffraction grating with a pre-set light wavelength and a pre-set angle of incidence is required, e.g. a reflection efficiency in the range of the maximum value of the reflection efficiencies with said polarisation direction which are achievable for said type of grating in the area around the pre-set incidence direction or light wavelength.

It is therefore the object of the present invention to develop a diffraction grating of the kind given in the introduction in such a way that as high an efficiency of the grating as possible is achieved.

Said object is achieved according to the invention by the fact that the slat exhibits a substantially rectangular cross-section, wherein the width of the slat, measured normal to the centre plane of the slat and parallel with the base area, comes to less than 100 nm, preferably between 20 nm and 60 nm, more preferably in the area of 50 nm.

The slats of the diffraction grating according to the invention with said slat widths are also referred to below as "narrow" slats. It may be shown by a calculation which incorporates the interaction between the light beams with TM polarisation and the slats that, surprisingly, a considerably better reflection efficiency of the diffraction grating is obtained with said slat widths, including for TM polarisation. The latter moreover, depending on the incidence direction and the wavelength of the incident light beams, does not vary strongly as in the case of known diffraction gratings with wider slats. Gratings with said narrow slats may accordingly be adapted, namely to the particular application in which angle of incidence and light wavelength are pre-set, by the choice of a suitable grating constant, without the above variations in the reflection efficiency for TM polarisation having to be allowed for or a special optimisation of the diffraction grating to the pre-set parameter pair "light wavelength" and "incidence direction" having to be carried out.

Although the best reflection efficiencies are obtained from the calculation for slat widths in the area of 10 nm, a slat width of 50 nm appears to be the best compromise between reflection efficiency and cost of manufacture.

The height of the slats above the base area may come to more than 200 nm, preferably between 200 nm and 600 nm. It was likewise found, surprisingly, in the calculation incorporating the polarisation interaction, that the reflection efficiencies depend on the slat heights. Above a slat height of 200 nm the reflection efficiencies moreover approximated very rapidly to an optimal value which recurs only periodically on further increasing of the slat height. There is obtained here, once again on manufacturing grounds, the lowest slat height pertaining to a given reflection efficiency.

The centre plane of the slat may lie normal to the base area. A diffraction grating of this kind may be manufactured relatively simply, since the privileged direction of the slat working lies normal to the base area of the support.

Alternatively the centre plane of the slat may include with the base area an angle other than 90°. By means of such an inclination of the slats compared with the base area of the support it may be additionally achieved that the slat flank facing the incident light beam lies in the area of a blaze angle for the particular application of the diffraction grating. An additional increase in the reflection efficiency is the result.

Preferably the diffraction grating consists of quartz glass or silicon. Such materials may be worked by reactive ion beam etching (RIBE) or by reactive ion etching (RIE) and are therefore considered for the holographic production of the diffraction structures according to the invention. If crystalline material such as silicon is used, it is possible in addition to align the crystal surface for the crystallographic orientation of the crystal in such a way that a privileged direction for the working, e.g. by anisotropic chemical etching with KOH, is obtained. Said privileged direction may be exploited e.g. in the production of inclined slate according to claim 4.

Alternatively the diffraction grating may consist of doped quartz. Such a material is suitable to be used because of its advantageous expansion characteristics.

If the diffraction grating consists, according to an alternative embodiment, of a dielectric layer system, the layer sequence may be so selected that an additional coating increasing the reflection efficiency of the diffraction grating may be dispensed with.

The layer system may furthermore comprise a multiplicity of mutually succeeding layers of $Al_2O_3$ (high refractive index) and $MgF_2$ (low refractive index) or of $LaF_3$ (high refractive index) and $MgF_2$ (low refractive index). An alternating layer system of this kind is highly suitable for the production of a highly reflecting layer for ultraviolet light wavelengths.

If the diffraction grating comprises a coating increasing the reflectivity, the execution of the support as a dielectric layer system may in turn be dispensed with, wherein a high reflectivity is nevertheless achieved. In the case of optical applications which permit a subsequent coating with a reflection layer, a more moderately priced manufacture of the diffraction grating is achieved in this way.

Preferred as a coating is an aluminium coating. A coating of this kind is relatively inexpensive and exhibits a high achievable reflectivity.

It is a further object of the present invention to indicate uses for the diffraction grating according to the invention in which the described advantages of the diffraction grating are put to good use. Said object is achieved by the preferred uses listed below:

A preferred use of the diffraction grating is that as a reflection grating in a Littrow configuration. In such an optical arrangement, with a given, often production-related grating constant and a fixed light wavelength, the incidence direction of the light beams is also fixed. There is no margin of variation, therefore, in the layout of the optical arrangement, so that full use is made of the advantage that the reflection efficiency of the diffraction grating with TM polarisation does not depend critically on the parameters "incidence direction" and "light wavelength".

Preferably the diffraction grating is used in third order of the light wavelength. Particularly with small light wavelengths, e.g. in the UV range, reduced requirements of the production of the diffraction grating are thereby obtained, since in third order a greater spacing of the diffraction gratings than in the first order meets the diffraction condition.

An advantageous field of use of the diffraction grating is the diffraction of UV light with a wavelength which is less than 250 nm. Such UV light sources are used in particular in projection lithography for the production of semiconductor structures in chip manufacture. With a diffraction grating according to the invention a wavelength which is narrow-band and efficient may be selected for such a projection light source.

A further preferred use of the diffraction grating is as a phase grating during interferometric length measurement. With said use a high grating efficiency is likewise required, which is ensured by the use of the diffraction grating according to the invention.

Embodiments of the invention will be explained in detail below from the drawing, in which.

Figure 1:
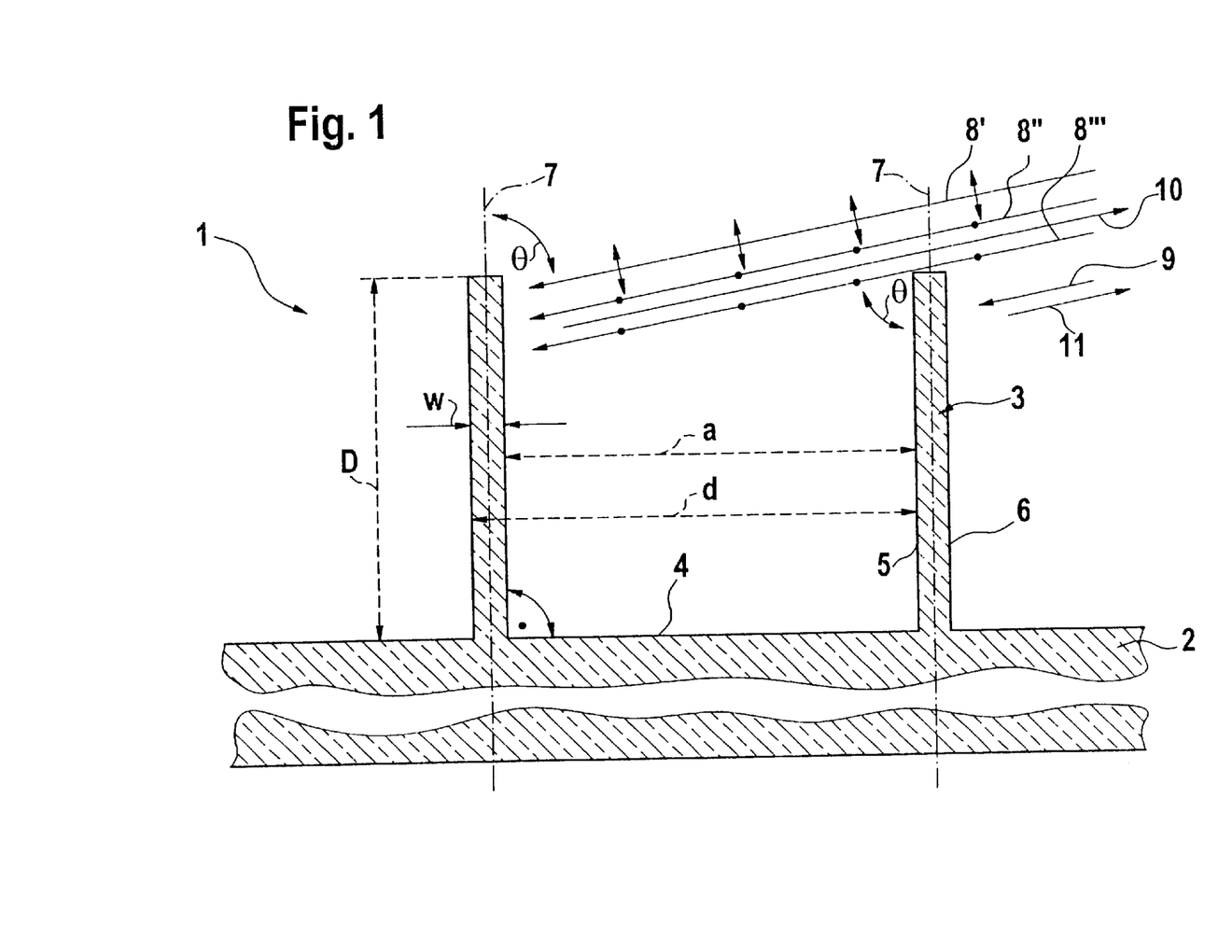
FIG. 1 shows a section through a detail of a reflection-diffraction grating, wherein the sectioning plane runs at right angles to the centre plane of diffraction structures of the reflection-diffraction grating which are formed as slats.

FIG. 1 shows a detail of a reflection-diffraction grating provided overall with the reference symbol 1, with a support 2, with which a multiplicity of periodically arranged slats 3 are integrally moulded, of which, as examples, two slats 3 are represented in cross-section in FIG. 1. The support 2 and the slats 3 consist of quartz glass.

The slats 3 have in each case a width w of 20 nm, measured in each case on the upper end of the slat 3 normal to its centre plane 7, which in its turn runs normal to the plane of drawing of FIG. 1. The height D of the slat 3 above the base area 4 comes to 250 nm.

The slats 3 have a rectangular cross-section, i.e. the flanks 5, 6 of a slat 3 include substantially a right angle with the base area 4. In particular the centre plane 7 of each slat 3 runs at right angles to the base area 4.

The thickness of the support 2 is very great compared with the height D of the slats 3, e.g. in the range of several millimeters, for which reason the support 2 is represented in broken lines in FIG. 1.

A diffraction structure of the reflection-diffraction grating 1 comprises in each case a slat 3 and, adjacent to the latter, a gap a up to the next slat 3. The width d of such a diffraction structure is therefore the sum of the slat width w and the gap a between two slats 3. The width d is dependent on the optical application in which the reflection-diffraction grating 1 is used. In the case given in FIG. 1, which will be described below, the width d is 297 nm.

In Littrow configuration the reflection-diffraction grating 1 functions as follows:

The reflection-diffraction grating 1 is so arranged with respect to parallel incident light beams which are emitted by a light source (not shown), and of which the light beams 8', 8", 8''' are shown by way of example in FIG. 1, that the centre planes 7 of the slats 3 include with the incident light beams 8, 9 the Littrow angle theta of 77°, which is obtained in third order for the specified width d and a light wavelength of 193.35 nm. The specified light wavelength is that of an argon-fluoride excimer laser. The incident light beams 8, 9 may here be polarised both normal to the extension direction of the slats 3 (TM polarisation, lightwave 8') and parallel with the extension direction of the slats (TE polarisation, light waves 8", 8'''), as is shown diagrammatically in FIG. 1.

With the chosen spacing d of the diffraction structures, the diffraction condition, i.e. the condition of constructive third-order interference, is met for light beams 10, 11 of the specified wavelength which are reflected back into the incidence direction. The reflection-diffraction grating 1 therefore acts for the incident light beams 8, 9 with the wavelength 193.35 nm as a mirror which reflects the incident light beams 8, 9 in third diffraction order back into themselves.

Figure 2:
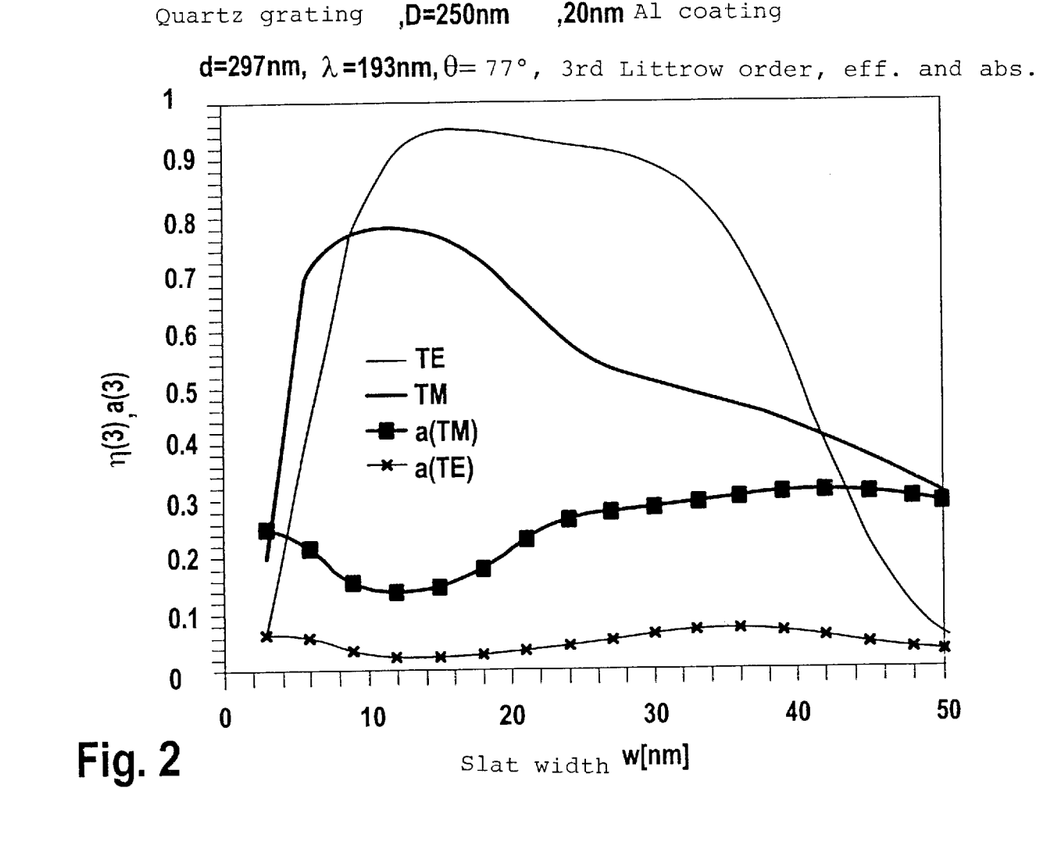
FIGS. 2 and 3 show two plots of the dependence of the diffraction efficiency or the absorption of a reflection-diffraction grating according to FIG. 1 on the slat width.

The efficiency of the reflection-diffraction grating may be calculated for the above-mentioned conditions for various slat heights D as a function of the slat width w:

For a slat height D of 250 nm there are obtained for a slat width range of between approx. 3 and 50 the plots shown in FIG. 2 of the reflection efficiencies for TE polarisation (thin solid line) and TM polarisation (thicker solid line) as well as the absorption curves for the TM polarisation (thick solid curve with squares) and the TE polarisation (thinner solid curve with crosses). There is obtained for the TE polarisation with a slat width w of approx. 16 nm a maximum of the reflection efficiency which is greater than 95%. The reflection efficiency is for said polarisation in a slat width range of between approx. 9 and approx. 35 nm greater than 80%. For the TM polarisation a maximum reflection efficiency of >80% is obtained in a slat width range of between approx. 8 and approx. 15 nm. In a slat width range of between approx. 5 and approx. 22 nm the reflection efficiency for the TM polarisation is over 60%. In said described ranges of high reflection efficiency the absorption of the irradiated light waves is always less than 30%, in the case of TE polarisation even less than 10%.

Figure 3:
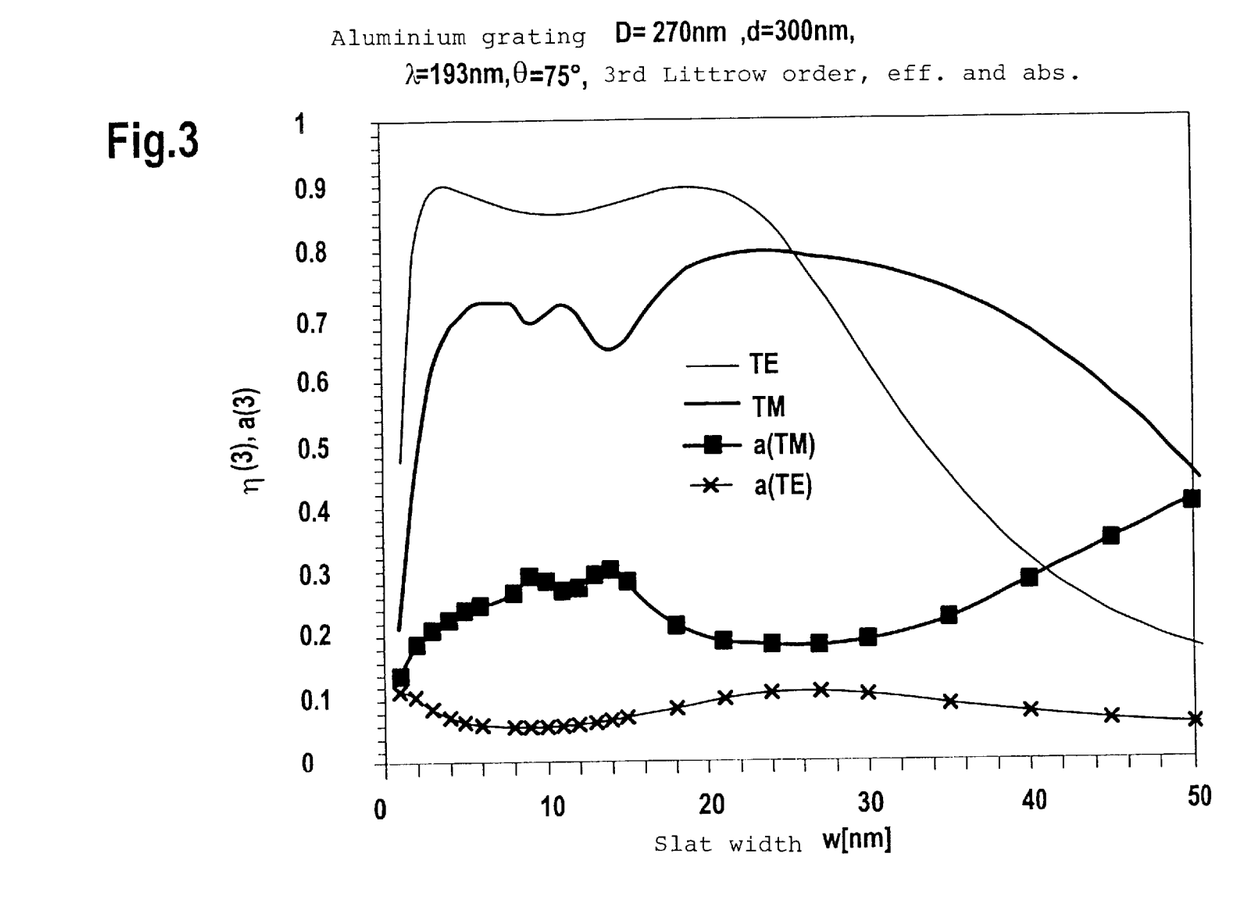

Similar efficiencies as a function of the slat width w are obtained theoretically with a slat height D of 270 nm, a grating constant d of 300 nm and a Littrow angle theta of 75°. In FIG. 3 the plots of reflection efficiency and absorption for the various polarisations (analogous line choice as for FIG. 2) are shown for a slat width range of between approx. 2 and 50 nm with said slat height D for a grating with slats of aluminium. There is obtained for the TE polarisation a maximum plateau of the reflection efficiency of approx. 90% in the range of a slat width w of between 3 nm and 20 nm. The reflection efficiency is for said polarisation greater than 60% up to a slat width w which comes to approx. 20 nm. There is obtained for the TM polarisation for slats with a width w of between approx. 4 nm and approx. 40 nm a reflection efficiency which lies in the area of 70%. The absorption values are here similar to those which were described in FIG. 2.

Figure 4:
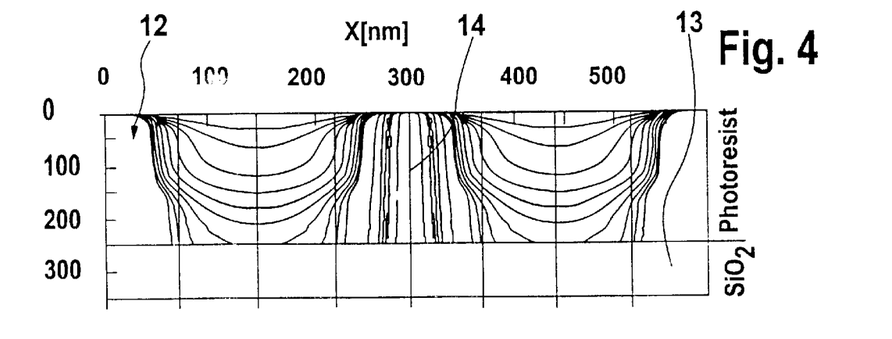
FIGS. 4 to 6 instantaneous exposures during the production of a reflection-diffraction grating according to FIG. 1.
Figure 5:
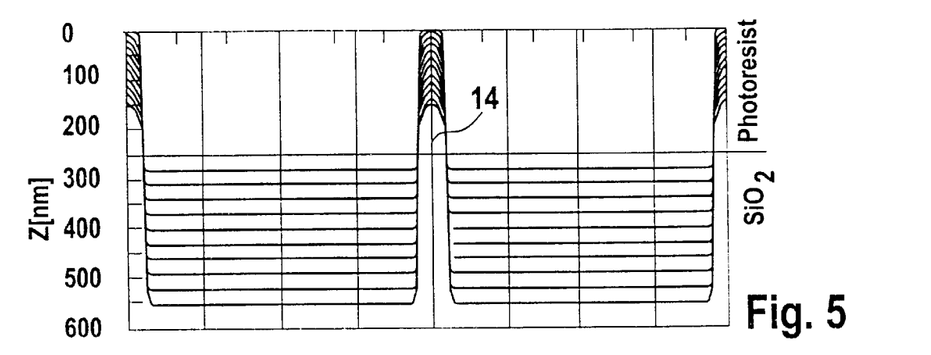
Figure 6:
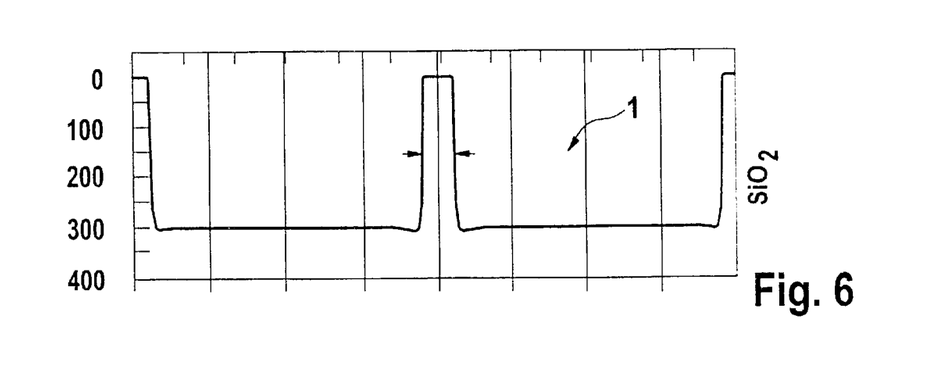

The production of a reflection-diffraction grating after the manner of the reflection-diffraction grating 1 of FIG. 1 makes clear the production stages which are represented in FIGS. 4 to 6. The sectioning plane selected for said figures is similar to that of FIG. 1.

In the first production step a grating blank 13 of quartz glass is coated with a photoresist mask 12, exposed holographically and then developed. FIG. 4 shows a time plot of the cross-section of said structure in the course of the development of the photoresist mask 12. The topmost curve of FIG. 4 represents the undeveloped photoresist mask 12, whose plane surface is parallel with that of the grating blank 13. In the course of the development there have remained in the image centre and the lateral edges of FIG. 4 photoresist slats 14, while between the slats 14 the photoresist is completely removed. The individual curves which are shown in FIG. 4 indicate the instantaneous height of the photoresist in the course of said photoresist removal at successive points in time. The photoresist slats 14 have already according to the setting by the exposure the mutual spacing which produces the spacing of 295.8 nm desired for the diffraction structures.

In a second production step the structure obtained in the first step is subjected to a reactive ion beam etching (RIBE) with $CF_4$. FIG. 5 shows a time plot of the cross-section of the grating blank 13 with the photoresist slats 14 during said process. Both the photoresist slats 14 and also the grating blank 13 are removed in layers with vertical privileged direction until an etching depth of approx. 550 nm, measured from the original surface of the photoresist mask 12, is obtained in the grating blank 13. Said state is represented by the bottommost curve in FIG. 5.

In a final production step the remaining photoresist slats 14 are removed. This produces a reflection-diffraction grating after the manner of the reflection-diffraction grating 1 of FIG. 1, as shown in FIG. 6.

Figure 7:
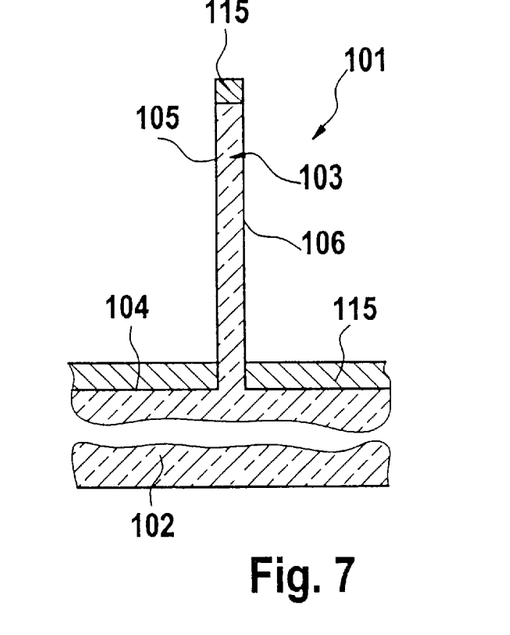
FIGS. 7 to 9 representations similar to FIG. 1 of alternative embodiments of a reflection-diffraction grating, wherein only one slat is shown in each case.
Figure 8:
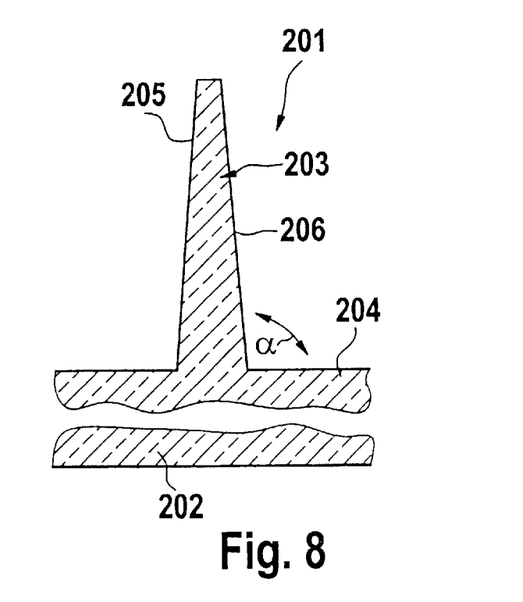
Figure 9:
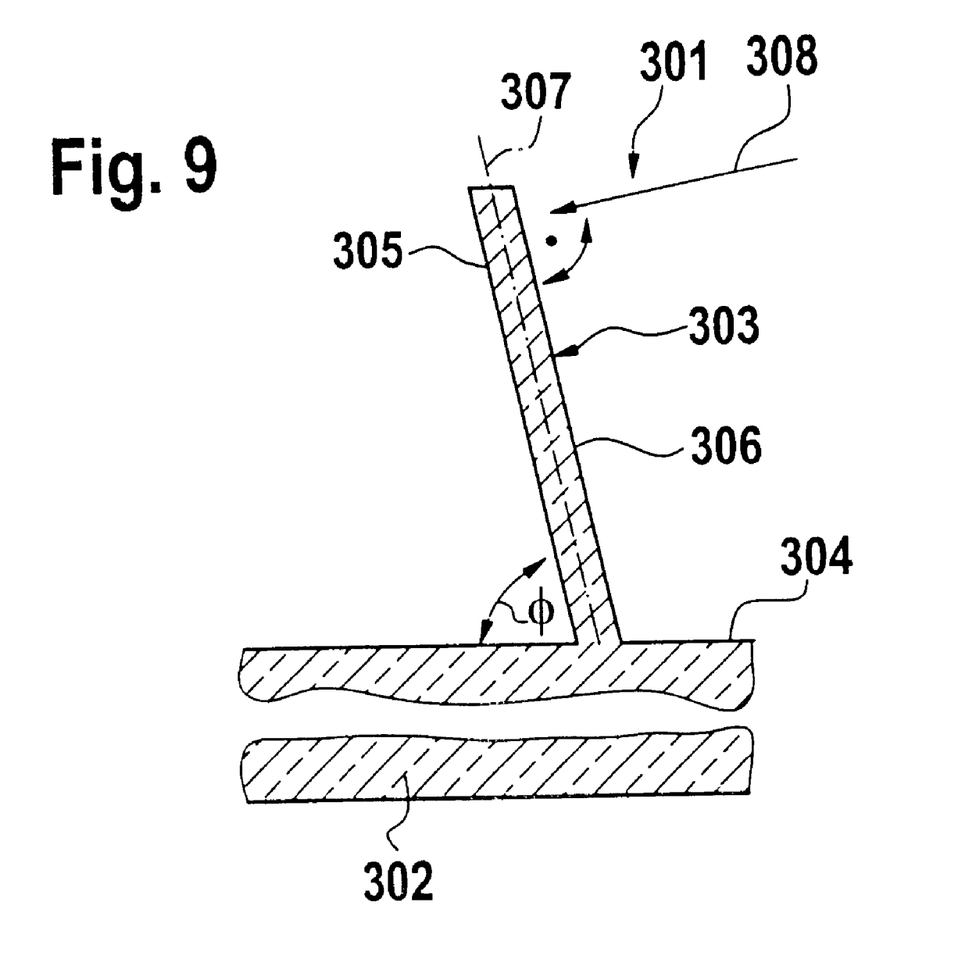

Alternative embodiments of the reflection-diffraction grating 1 are shown in FIGS. 7 to 9. Components which match those which have already been described above are each provided with reference symbols increased by 100 and will not be explained in detail again.

The reflection-diffraction grating 101 of FIG. 7 comprises an aluminium layer 115. The latter has a thickness of approx. 20 nm. There was selected for the coating of the reflection-diffraction grating 101 with the aluminium layer 115 a coating technique with a privileged direction, so that the surfaces of the support 102 and of the slat 103, but not the flanks 105, 106 of the slat 103, are coated. Alternatively, however, the flanks of a slat may also be coated reflectively in analogous manner. The aluminium layer 115 has a reflectivity of almost 100%.

The process steps shown in FIGS. 4 and 5 for the production of the reflection-diffraction grating 1 may be varied specifically in order to adjust the flank steepness of the slats 3. In this way there may be produced a reflection-diffraction grating 201 shown in FIG. 8 with slats 203 whose flanks 205, 206 are not normal to the base area 204, but include with it an angle a other than 90° such that the slat 203 is thicker at its base than at its tip. In order to increase the efficiency of the reflection-diffraction grating 201, the inclination of the flanks 205, 206 may e.g. be such that they correspond to a blaze angle for the corresponding use of the reflection-diffraction grating 201. In the case of the Littrow configuration described above the flank inclination angle α would have the following value: α=180°-theta. In this case the flank inclination angle a should fulfil the following relation: 90°<α<105°. Overall, therefore, the slat 203 is also "narrow" in the sense defined above.

In the reflection-diffraction grating 301 shown in FIG. 9 the centre planes 307 of the slats 303 are, by corresponding choice of the privileged direction in the production process described in connection with FIGS. 4 to 6, inclined with respect to the base area 304 of the support 302. The smaller angle φ which the centre plane 307 includes with the base area 304 differs from the angle theta by 20° at the most, i.e. it has a value which fulfils the following relation to the Littrow angle theta: theta−20°<φ<theta+20°.

If the reflection-diffraction grating 301, as is indicated by the incident light wave 308 in FIG. 9, is operated in Littrow configuration, the incident light wave 308 impinges on the grating 301 almost normal to the centre planes 307 of the slats 303.

The application of the reflection-diffraction grating 1 to 301 is not limited to the Littrow configuration described. Other applications, e.g. as blaze gratings (angle of incidence not equal to angle of reflection), are conceivable, wherein here also the inclination of the centre planes 7 to 307 or of the flanks 5 to 305; 6 to 306 is selected accordingly.

A grating with the diffraction structures described above may also be used as a phase grating during interferometric length measurement.

In addition to quartz glass, anisotropic materials such as silicon or doped quartz or else a dielectric layer system may also be used as a support material. The dielectric layer system is e.g. an alternating layering of $Al_2O_3$ (high-refractive index) and $MgF_2$ (low-refractive index) or $LaF_3$ (high-refractive index) and $MgF_2$ (low-refractive index), wherein e.g. 40 double layers of said two materials are used. The layer thicknesses of the individual layers of the dielectric layer system are selected so that the reflecting power of the reflection-diffraction grating is optimised for the wavelength used.

Depending on the support material employed, there are used as alternatives to the above-mentioned reactive ion beam etching (RIBE) for example also reactive ion etching (RIE), ion beam etching (IBE, preferably in conjunction with a IS dielectric layer system) or anisotripic chemical etching (e.g. with KOH, preferably for anisotropic materials such as crystalline silicon).

What is claimed is:

1. A method of use for a diffraction grating with a multiplicity of parallel diffraction structures succeeding one another periodically, which are arranged on a support and each incorporate a slat extending from a base area of the support, characterized in that the (3; 103; 203; 303) slat exhibits a substantially rectangular cross-section, wherein the width w of the slat (3; 103; 203; 303), measured normal to the center plane (7; 307) of the slat (3; 103; 203; 303) and parallel with the base area (4; 104; 204; 304), comes to less than 100 nm, wherein the method includes the steps of:

matching a wavelength of an incident light source to an angle of incidence of the light source relative to the diffraction grating; and using the diffraction grating as a reflection grating in a Littrow configuration.

2. The method of use of a diffraction grating according to claim 1, characterized in that the height D of the slat (3; 103; 203; 303) above the base area (4; 104; 204; 304) comes to more than 200 nm.

3. The method of use of a diffraction grating according to claim 2, wherein the height D of the slat (3; 103; 203; 303) is between 200 nm and 600 nm.

4. The method of use of a diffraction grating according to claim 1, characterized in that the centre plane (7) of the slat (3) is normal to the base area (4).

5. The method of use of a diffraction grating according to claim 1, characterized in that the centre plane (307) of the slat (303) includes with the base area (304) an angle other than 90°.

6. The method of use of a diffraction grating according to claim 1, characterized in that the diffraction grating consists of quartz glass or silicon.

7. The method of use of a diffraction grating according to claim 1, characterized in that the diffraction grating consists of doped quartz.

8. The method of use of a diffraction grating according to claim 1, characterized in that the diffraction grating comprises a dielectric layer system.

9. The method of use of a diffraction grating according to claim 8, characterized in that the layer system comprises a multiplicity of mutually succeeding layers of $Al_2O_3$ and $MgF_2$.

10. The method of use of a diffraction grating according to claim 8, characterized in that the layer system comprises a multiplicity of mutually succeeding layers of $LaF_3$ and $MgF_2$.

11. The method of use of a diffraction grating according to claim 1, characterized in that the diffraction grating comprises a coating (115) increasing the reflectivity.

12. The method of use of a diffraction grating according to claim 11, characterized in that the coating (115) is an aluminum coating.

13. The method of use of a diffraction grating according to claim 1 in higher than first order of the incident light wavelength.

14. The method of use of a diffraction grating according to claim 13, wherein the higher than first order comprises the third order of the incident light wavelength.

15. The method of use of a diffraction grating according to claim 1 for the diffraction of UV light (8; 9; 308) with a wavelength which is less than 250 nm.

16. The method of use of a diffraction grating according to claim 1 as a phase grating during interferometric length measurement.

17. The method of use of a diffraction grating according to claim 1, wherein the width w of the slat (3; 103; 203; 303) is between 20 nm and 60 nm.

18. The method of use of a diffraction grating according to claim 17, wherein the width w of the slat (3; 103; 203; 303) is approximately 50 nm.

* * * * *